US008200774B1

(12) United States Patent
Redstone et al.

(10) Patent No.: US 8,200,774 B1
(45) Date of Patent: Jun. 12, 2012

(54) SYSTEM AND METHOD FOR RESOURCE LOCKING

(75) Inventors: Joshua A. Redstone, Mountain View, CA (US); Sean Quinlan, Menlo Park, CA (US); Michael Burrows, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1116 days.

(21) Appl. No.: 10/957,550

(22) Filed: Sep. 30, 2004

(51) Int. Cl.
*G06F 15/16* (2006.01)

(52) U.S. Cl. ........................................ 709/217; 707/704

(58) Field of Classification Search .................. 710/200; 707/8, 9, 704, 999.008; 709/228, 217
See application file for complete search history.

(56) References Cited

U.S. PATENT DOCUMENTS

| | | | | |
|---|---|---|---|---|
| 5,713,017 | A * | 1/1998 | Lin et al. ............................... | 1/1 |
| 6,772,255 | B2 * | 8/2004 | Daynes ........................ | 710/200 |
| 6,973,455 | B1 * | 12/2005 | Vahalia et al. ..................... | 707/8 |
| 7,047,299 | B1 * | 5/2006 | Curtis .......................... | 709/225 |
| 2002/0052959 | A1 * | 5/2002 | Freitas et al. .................. | 709/226 |
| 2002/0103804 | A1 * | 8/2002 | Rothschild et al. ............. | 707/10 |
| 2002/0147719 | A1 * | 10/2002 | Zhang et al. ...................... | 707/9 |
| 2003/0145146 | A1 * | 7/2003 | Posner et al. ................. | 710/200 |
| 2003/0217152 | A1 * | 11/2003 | Kasper, II ..................... | 709/226 |
| 2004/0019679 | A1 * | 1/2004 | E et al. ........................... | 709/226 |
| 2004/0078360 | A1 * | 4/2004 | DeFauw ........................... | 707/3 |
| 2004/0078637 | A1 * | 4/2004 | Fellin et al. ....................... | 714/6 |
| 2004/0148447 | A1 * | 7/2004 | Conrad et al. ................ | 710/200 |
| 2004/0260768 | A1 * | 12/2004 | Mizuno ......................... | 709/203 |
| 2005/0004990 | A1 * | 1/2005 | Durazo et al. ................ | 709/206 |
| 2005/0022047 | A1 * | 1/2005 | Chandrasekaran ............... | 714/4 |
| 2005/0182856 | A1 * | 8/2005 | McKnett ....................... | 709/248 |
| 2005/0240738 | A1 * | 10/2005 | Shirogane et al. ............ | 711/152 |
| 2005/0256822 | A1 * | 11/2005 | Hollingsworth ................. | 707/1 |
| 2007/0198517 | A1 * | 8/2007 | Bresch et al. .................... | 707/8 |

* cited by examiner

*Primary Examiner* — Ryan Jakovac
(74) *Attorney, Agent, or Firm* — Morgan, Lewis & Bockius LLP

(57) ABSTRACT

A server system includes a processor and a data structure having an entry for a resource, the entry including a first sequence number. The server has communication procedures for receiving a request from a client to access the resource, where the request includes a second sequence number obtained from a service, and a resource request handling program. Upon receiving the request, the resource request handling program determines whether the server has any record of having previously received a request to access the resource. If not, the server returns a provisional rejection to the client, requiring the client to verify that it holds a lock on the specified resource. A provisional bit in the entry is initially set to indicate that the resource has not been accessed since the system was last initialized. The provisional bit is reset when a request to access the resource is granted.

21 Claims, 5 Drawing Sheets

SYSTEM AND METHOD FOR RESOURCE LOCKING

The invention relates generally to accessing data across a computer network. More specifically, the invention relates to a system and method for enforcing resource locking across a computer network.

BACKGROUND OF THE INVENTION

In general, distributed networks contain at least one server and multiple remote clients that access one or more resources (e.g., data files) on the server. Locking facilities are typically provided in such distributed networks to control the use of the resources by the multiple clients. By acquiring a lock on a record, or a file, or other resource (typically located on a server), a client indicates its intention to make use of the record, file or other resource. In practice there are various kinds of locks, including locks for enforcing exclusive access, locks for enforcing shared access, locks on portions of a data file, and locks on an entire data file.

Typically, such distributed networks contain a global locking service for distributing locks to each of the multiple clients requiring access to the resources. For example, each time a client requires accessing a resource on the server, the client requests and obtains a lock from the global locking service. The lock is used to protect access to the resource on the server, i.e., only those clients that hold a valid lock are allowed to access to the resource. The client then transmits the lock to the server together with a request to access the resource, and the server determines if it should grant access to the resource. Typically, the server queries the global locking service to determine whether the lock is valid. If the lock is valid the client is allowed access to the resource. If the lock is not valid the request to access the resource is rejected.

The above-described method requires constant communication between the server and the global locking service. However, this constant communication is inefficient, as it consumes bandwidth and places an unnecessary high load on the global locking server. In addition, extra programming care is required to allow the server to continue responding to client requests even when the global locking service becomes unavailable. Examples of requests the server may respond to are requests for resources not protected by locks, and requests for resources that are protected by locks managed by a different global locking service (i.e., there may be multiple, independent global locking services, and different resources may be protected by locks managed by different locking services).

Another existing system for controlling locks requires synchronization between the clocks on the clients, server, and global locking service. If the clocks are synchronized, then leases that expire after a set time can be used by the system. For example, when the client obtains a lock, it also receives a lease. The lease includes an expiration time, which declares that the client holds the lock until at least the expiration time. The client transmits the lease to the server along with its request to access the file. The server checks its clock, and accepts the request to access the file if the lease has not yet expired. However, this method either requires 1) communication between the server and the global locking service to synchronize times, or 2) communication between the sever and a remote clock, and communication between the global locking service and the remote clock. Again such constant communication is inefficient. Moreover, this method is also subject to clock skew caused by propagation delays or the like.

To reduce communication between the server and the lock service, some systems store state information about lock distribution and validation. The server consults this state rather than contacting the locking service. To avoid requiring the server to contact the locking service upon restart, this state must be made persistent. However, maintaining a persistent state requires non-volatile memory, and also requires procedures for re-establishing the state of the system when recovering from a crash or power failure or the like, which adds expense to the system.

In light of the above, it would be highly desirable to provide a system and method for enforcing a locking regime at a server without requiring a local persistent state and without requiring direct constant communication between the server and a global locking service.

SUMMARY OF DESCRIBED EMBODIMENTS

A server system includes a processor and a data structure having an entry for a particular resource, the entry including a first sequence number. The server has communication procedures for receiving a request from a client to access the particular resource, where the request includes a second sequence number obtained from a service. Upon receiving the request, a resource request handling program determines whether the server has any record of having previously received a request to access the particular resource. If not, the server returns a provisional rejection to the client, requiring the client to verify that it holds a lock on the specified resource.

In some embodiments, a provisional bit in the entry is initially set to indicate that the particular resource has not been accessed since the system was last initialized. The provisional bit is reset when a request to access the particular resource is granted. When a request to access the particular resource contains a sequence number that is not equal to the sequence number in the entry, the state of the provisional bit determines how the request is processed. In some embodiments, if the provisional bit is set, the server responds with a provisional rejection of the request. If the provisional bit is not set, and the sequence number in the request is higher than or equal to the sequence number in the entry, the request is granted and the sequence number in the entry is set equal to the sequence number in the request. Further, if the sequence number in the request is lower than the sequence number in the entry, the request is rejected.

In another embodiment of the invention, a server system includes a processor and a data structure having an entry for a particular message thread, the entry including a first sequence number. The server has communication procedures for receiving a message from a client, where the message includes a second sequence number obtained from a service. The message also is identified as belonging to the particular message thread. Upon receiving the message, a message handling program determines whether the server has any record of having previously received a message with respect to the particular message thread. If not, the server returns a provisional rejection to the message, requiring the client to verify the second sequence number and to resubmit the message.

BRIEF DESCRIPTION OF THE SEVERAL VIEWS OF THE DRAWINGS

Like reference numerals refer to corresponding parts throughout the several views of the drawings.

DETAILED DESCRIPTION OF EMBODIMENTS

In the embodiments described below, the clients of the system are either assumed to not be malicious, or the clients of the system are assumed to have been authenticated in a manner outside the scope of the lock management system and method described here. From another viewpoint, any client request (to access a resource) that reaches the point of an accept/reject decision by the appropriate server is assumed to come from a client that is in full compliance with the resource management rules of the system. In addition, the communications mechanisms used between the components of the system are assumed to recognize and discard duplicate messages that may be introduced by the network hardware or software. Thus, if a message is received that is substantially similar to one received previously, it is because the sender has sent a substantially similar message according to the methods described below. Building on these assumptions, the embodiments described below avoid the aforementioned limitations of prior art systems.

Figure 1:
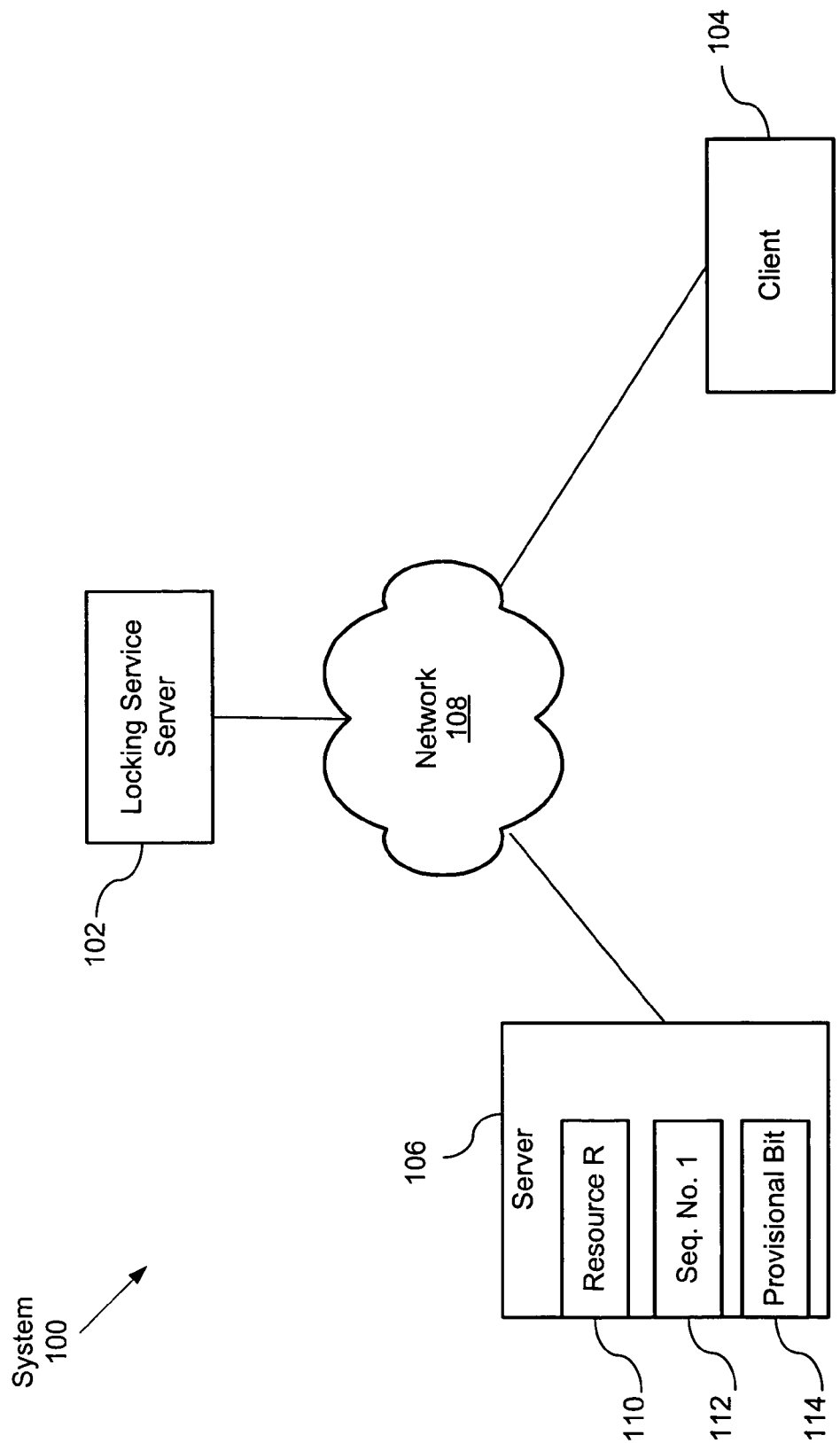
FIG. 1 is a block diagram of an exemplary locking system.

FIG. 1 is a block diagram of a locking system 100. The locking system 100 enforces limits on access to each protected resource in the system. For example, write access to a resource may be granted to only one client at a time to guarantee consistency. The locking system 100 includes at least one locking service server 102, at least one client 104 and at least one server 106, all coupled to one another via one or more communication networks 108. The locking service server 102 may be a standard locking service server as is well understood in the art, and as further explained below with reference to FIGS. 3A and 3B. The locking service server 102 supplies locks to the client 104 when the client 104 requests a lock to access a resource 110 on the server 106. Of course, if a resource is already locked, the lock request may be denied by the locking service server 102. Each lock enforces limits on access to the resource on the server. Such locks may include: advisory locks, where the client acquires the lock before accessing the corresponding resource; mandatory locks, where attempting unauthorized access to a locked resource will force an exception in the entity attempting to make the access; a semaphore lock, where no distinction is made between shared (read only) or exclusive (read and write) modes; shared locks, where several clients can acquire a shared lock for read-only access to the resource; exclusive locks; and the like.

The network 108 comprises a series of points or nodes interconnected by communication paths. The network 108 may interconnect with other networks, may contain subnetworks, and may be characterized in terms of its spatial distance as either a local area network (LAN), a metropolitan area network (MAN), a wide area network (WAN), or a global network, such as the Internet. The network may further be characterized by the type of data transmission technology used, such as, without limitation, a TCP/IP (Transmission Control Protocol/Internet Protocol) network, an SNA (Systems Network Architecture) network, or an ATM (Asynchronous Transfer Mode) network. The client 104 and servers 102 and 106 connect to the network via communication links, such as coaxial cable, copper wire, optical fiber, radio waves, microwave, satellite links, or other wired or wireless links.

The servers 102 and 106 and client 104 may be any suitable computing devices that are capable of connecting to the network 118, such as personal computers, rack mounted computers running server software, laptop computers, or the like. The server 106 contains at least one resource 110, a sequence number 112, and a provisional bit 114, as explained in further detail below in relation to FIGS. 2A, 2B, 3A, and 3B.

Figure 2A:
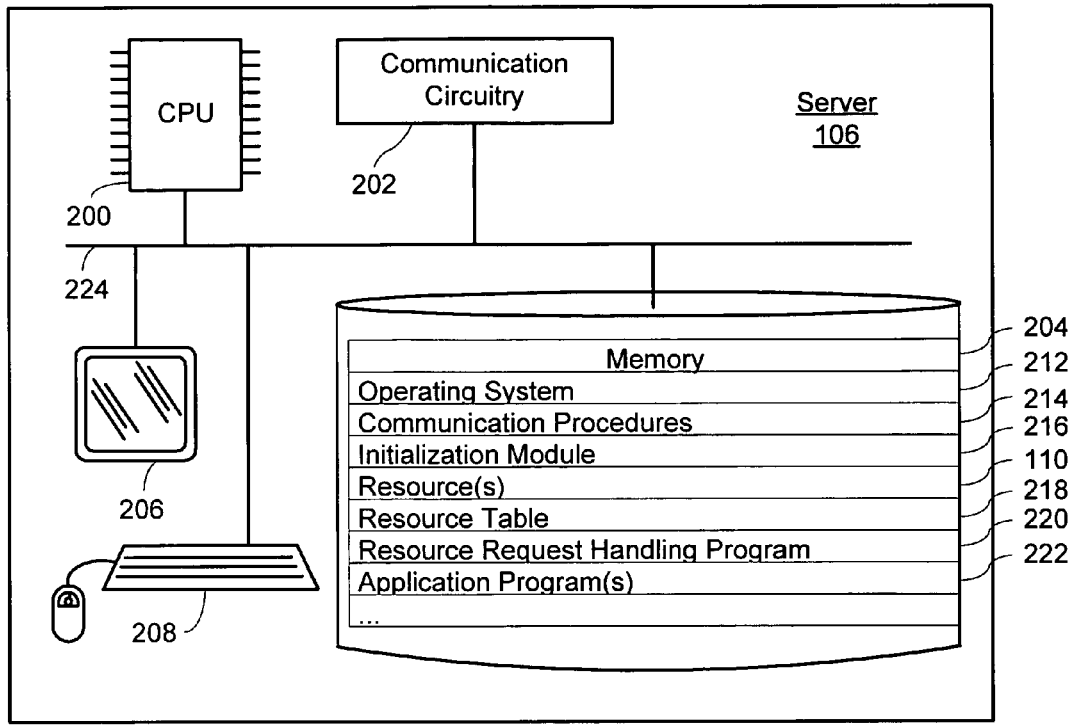
FIG. 2A is a block diagram of the server shown in FIG. 1.

FIG. 2A is a more detailed block diagram of the server 106 shown in FIG. 1. The server 106 include at least one data processor or central processing unit (CPU) 200; communication circuitry 202 for communicating with the network 108, locking service server 102, and client 104 (all of FIG. 1); a memory 204; and at least one bus 224 that interconnects the aforementioned components. The server 106 may also optionally include one or more user interface devices, such as a monitor 206 and a keyboard and mouse 208. The communications circuitry may include one or more Network Interface Cards (NICs) for communicating with the network 118 using one or more communication protocols, such TCP/IP, ATM, Ethernet, or the like.

The memory 204 may include volatile (non-persistent) memory, such as high-speed random access memory, and may also include non-volatile memory, such as one or more magnetic disk storage devices. The memory 204 stores an operating system 212, such as LINUX, UNIX or WINDOWS that includes procedures for the direct control and management of hardware and basic system operations, as well as running application software. The memory 204 may also store communication procedures 214 used for communicating with the network 108, locking service server 102, and client 104 (all of FIG. 1).

The memory 204 also may include: an initialization module 216, resource(s) 110, a resource table 218, a resource request handling program 220, and other application program(s) 222. The initialization module 216 initializes the server 106, i.e., sets-up the server when the server is initially switched-on or when the server is power-cycled, such as after a system crash. The resource(s) 110 may be any resources, such as data files or the like. The resource table 218 contains lock information for a list of resource entries, as described below in relation to FIG. 2B. The resource request handling program 220 handles all requests for resources 110, as described below with reference to FIGS. 3A and 3B.

Figure 2B:
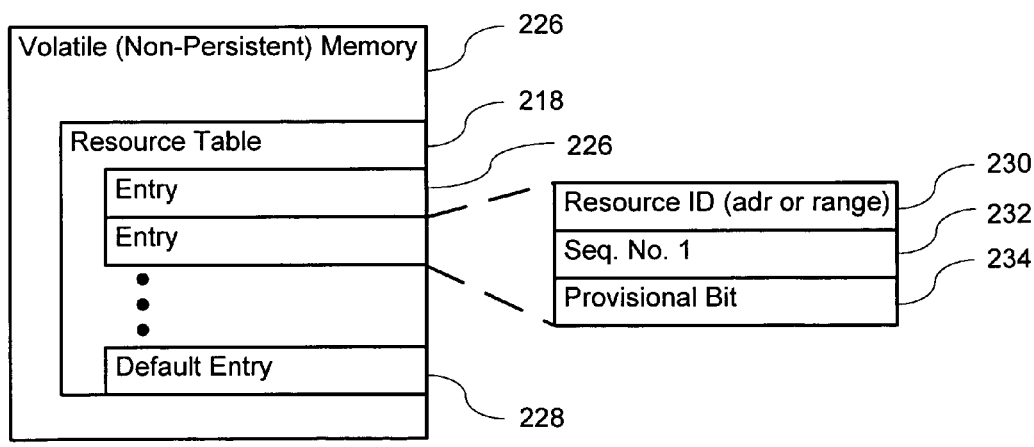
FIG. 2B is a block diagram of the resource table shown in FIG. 2A.

FIG. 2B is a block diagram of an exemplary resource table 218. In some embodiments, the resource table 218 is stored in volatile (non-persistent) memory 226 that forms part of the memory 204 (FIG. 2A). For this reason, the resource table 218 is assembled on-the-fly as requests for resources are received by the server 106 (FIG. 1). In other words, when the server 106 (FIG. 1) is shutdown, the resource table 218 (FIG. 2B) is lost, and will be reassembled as requests for resources are received by the server, as explained below with reference to FIGS. 3A and 3B.

The resource table 218 contains a resource entry 226 for each resource 110 or for a subset of the resources 110 (FIG. 2A). A default entry 228 as used as a template for a new resource entry that is assembled the first time that a request is received for a particular resource, as explained below with reference to FIGS. 3A and 3B. In some embodiments, the default entry is part of the resource request handling program 220 (FIG. 2A) and is not stored in the resource table 218. Each resource entry 226 includes a resource identifier (ID) 230 that identifies a particular resource 218 (FIG. 2A). For example, the resource ID 230 may be the address of the resource 218 (FIG. 2A) or a range of addresses associated with the resource. Each resource entry 226 also includes the latest received sequence number 232 (Sequence No. 1) for that resource. Finally, each resource entry 226 also includes a provisional bit 234 that can be set to true (1) or false (0). Use of the resource ID 230, sequence number 232 and the provisional bit 234 are described in detail below in relation to FIGS. 3A and 3B.

In some embodiments, the server may at any time discard entries from the resource table 218. It may do so to reclaim memory, for example.

Figure 2C:
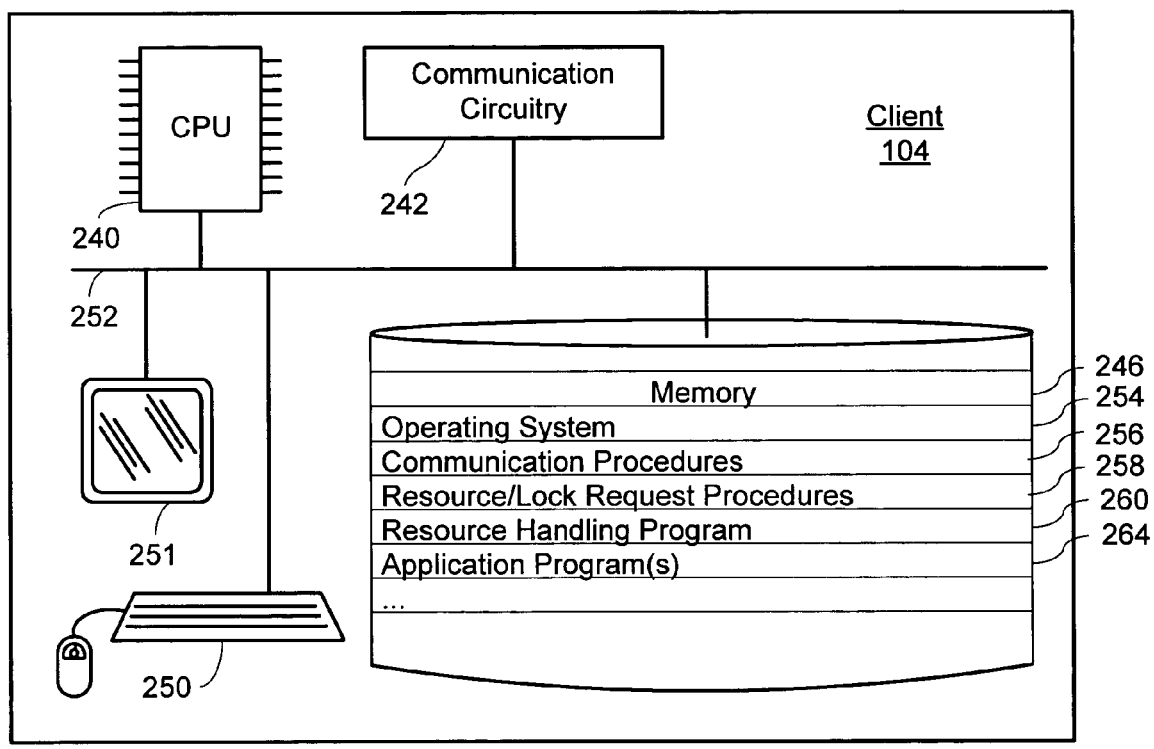
FIG. 2C is a block diagram of the client shown in FIG. 1.

FIG. 2C is a more detailed block diagram of the client 104 shown in FIG. 1. In some embodiments, the client 104 includes at least one data processor or central processing unit (CPU) 240; communication circuitry 242 for communicating with the network 118, locking service server 102, and server 106 (all of FIG. 1); a memory 246; and at least one bus 252 that interconnects the aforementioned components. The client 104 may also optionally include one or more user interface devices, such as a monitor 251 and a keyboard and mouse 250 also coupled to the bus 252. In some embodiments, the communications circuitry includes one or more Network Interface Cards (NICs) for communicating with the network 108 (FIG. 1) using one or more communication protocols, such TCP/IP, ATM, Ethernet, or the like.

The memory 246 may include volatile (non-persistent) memory, such as high-speed random access memory, and may include non-volatile memory, such as one or more magnetic disk storage devices. The memory 246 stores an operating system 254, such as LINUX, UNIX or WINDOWS that includes procedures for the direct control and management of hardware and basic system operations, as well as running application software. The memory 246 may also store communication procedures 256 used for communicating with the network 118, locking service server 102, and server 106 (all of FIG. 1).

The memory 246 also may include resource request/lock procedures 258, resource handling procedures 260, and other application program(s) 264. The resource request/lock procedures 258 request locks from the locking service server 102 (FIG. 1), obtain a lock from the locking service server, and request access to resource(s) 110 (FIG. 2B) from the server 106 (FIG. 1). The resource handling procedures 260 access and use the resource(s) 110 (FIG. 2A).

Figure 3A:
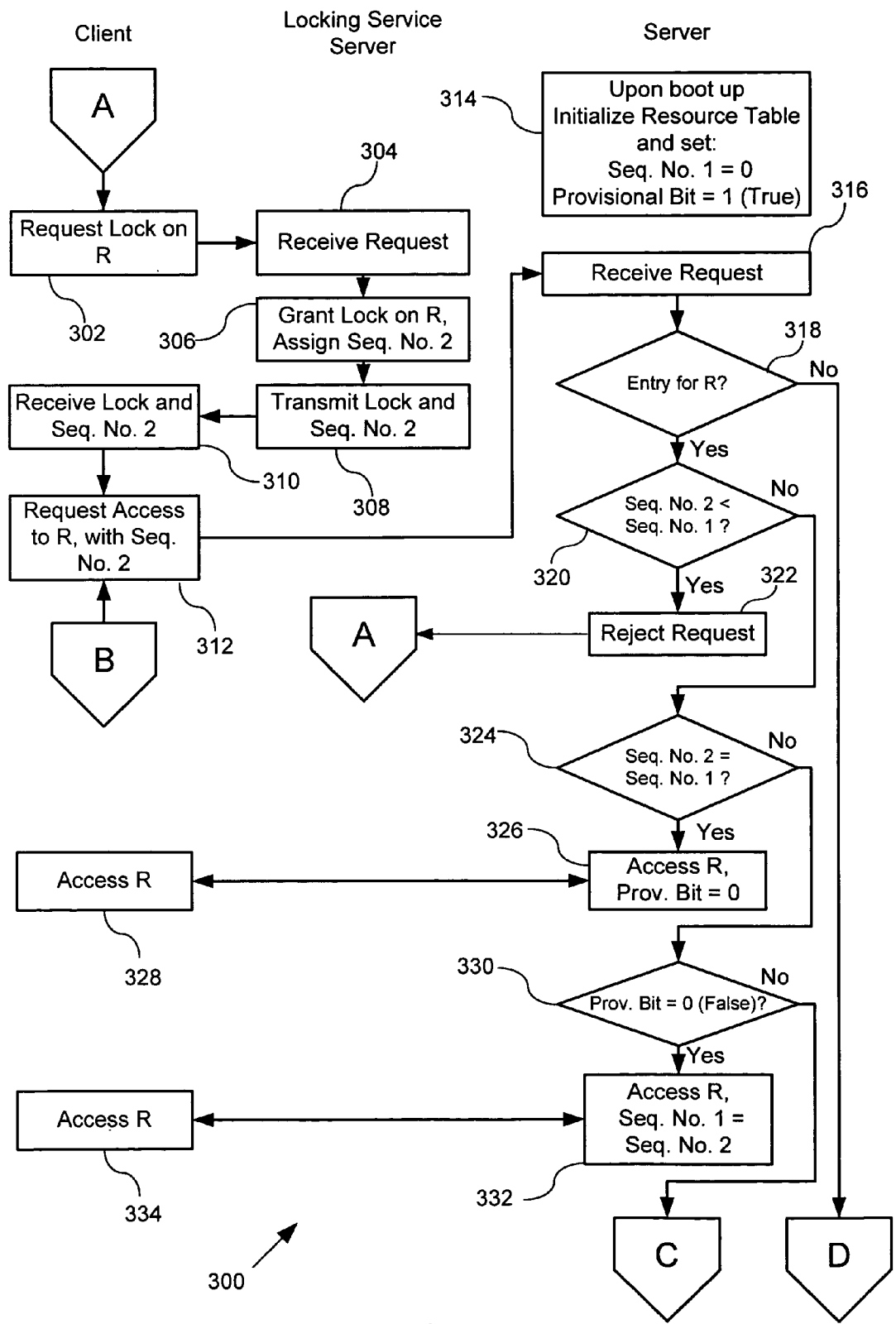
FIGS. 3A-3B are flow charts of a method for enforcing access to resources on a server.
Figure 3B:
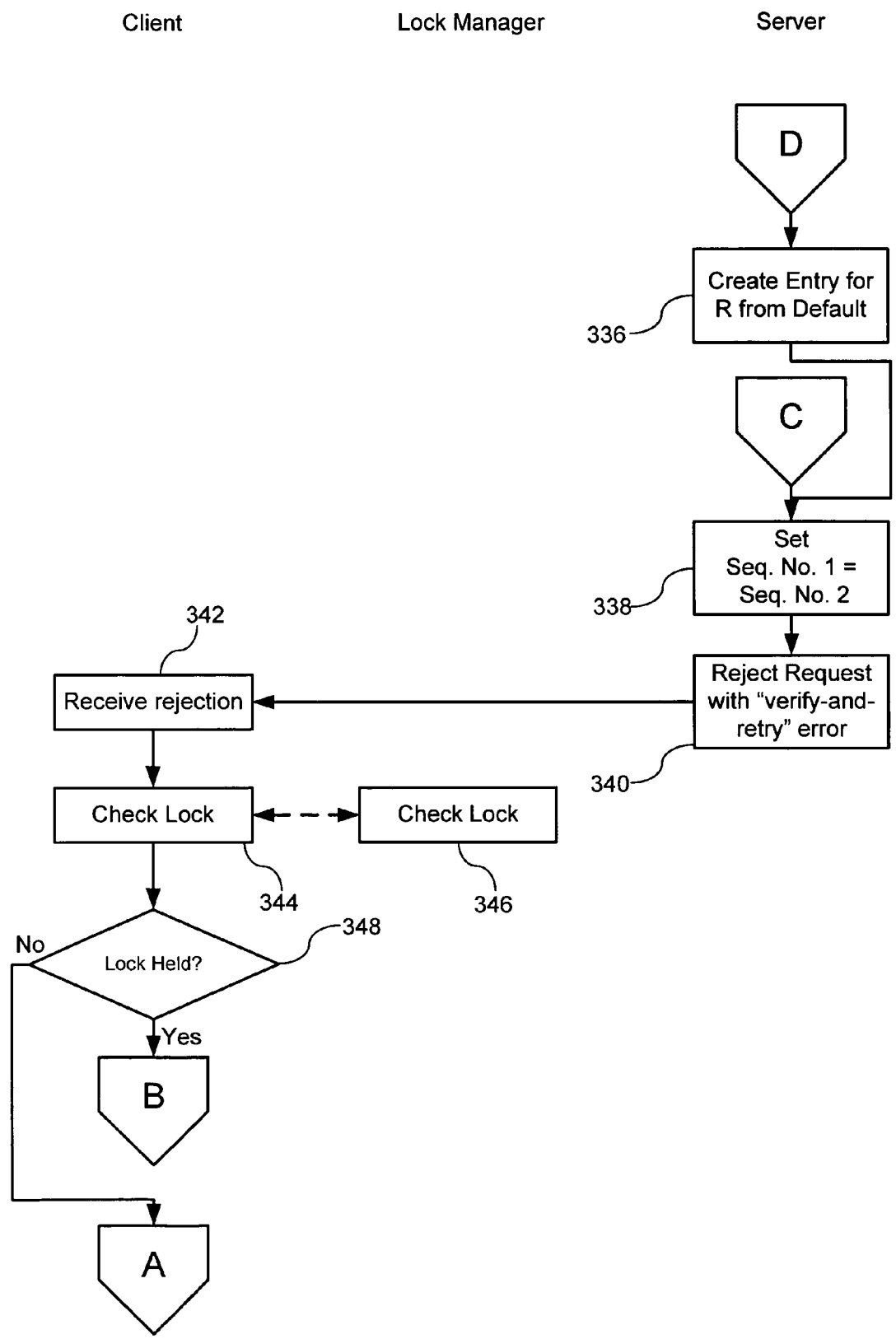

FIGS. 3A-3B are flow charts of a method for enforcing access to resources on the server 106 (FIG. 1). Whenever the server 106 (FIG. 1) is initialized, i.e., switched-on or booted, the initialization module 216 (FIG. 2A) initializes the resource table 218 (FIG. 2A), at 314. In some embodiments, initialization of the resource table is necessary as the resource table is stored in volatile (non-persistent) memory 226 (FIG. 2B), and, therefore, cannot keep any persistent state information. Also in some embodiments, initialization of the resource table is necessary as the server cannot communicate with the locking server to discover the current sequence number for a particular resource.

In some embodiments, initialization of the resource table comprises creating a single default entry 228 (FIG. 2B). Alternatively, an entry may be generated for each resource at initialization of the server, where each entry contains the same information as the default entry, described below.

The default entry includes a first sequence number 232 (sometimes herein called "Seq. No. 1") (FIG. 2B) that is set to a value lower than any possibly valid received sequence number. For example, the first sequence number 232 (Seq. No. 1) in the default entry is set to zero (0). The provisional bit in the default entry is initialized to true (1).

Whenever the client 104 (FIG. 1) wants to access a resource R of the resource(s) 110 (FIG. 1 and FIG. 2A), the client requests a lock for the resource R from the locking service server 102 (FIG. 1) at 302. The locking service server receives the request for the lock, at 304, grants a lock on resource R by assigning the next available sequence number (sometimes herein called "Seq. No. 2") for that resource R to the client making the request, at 306. A sequence number is a monotonically increasing logical number or timestamp. For example, the next available sequence number, otherwise referred to as the second sequence number (Seq. No. 2), may be 0004 where the previous sequence number was 0003. The lock and second sequence number (Seq. No. 2) is then transmitted toward the client at 308.

It is noted here that FIG. 3A does not explicitly address the situation in which a client's lock request is denied by the locking service server. When this happens, the client may retry the request until the lock is granted at 306, or it may perhaps abandon the effort. The present discussion only concerns what happens when a client request for a lock is granted.

The client receives the lock and second sequence number, at 310, and requests access to the resource R from the server 106 (FIG. 1), at 312. The request for access includes the lock, which itself includes the second sequence number (Seq. No. 2). Alternatively, the request for access only includes the second sequence number (Seq. No. 2). In some embodiments, the request for access includes authentication information, such that the server can authenticate that the client is authorized to access the server. In such embodiments, the server authenticates the client or the request at 316 prior to further processing of the request. However, in some embodiments, it is assumed that the client 104 (FIG. 1) is not malicious, and, therefore, no authentication is required.

The server 106 (FIG. 1) receives the request for access to the resource R at 316. The resource request handling program 220 (FIG. 2A) on the server then determines whether there is an entry 226 (FIG. 2B) for the resource R, for which access is being requested, at 318. If there is no entry for resource R (318—No), i.e., this request is the first request for resource R since the server was initialized, then the resource request handling program creates a new entry for the resource in the resource table at 336 (FIG. 3B). The default entry 228 (FIG. 2B) may be used as the template for the new entry for the resource R. As a result, the new entry for resource R includes a provisional bit set to true (1). Optionally, the first sequence number (Seq. No. 1) of the new entry may be set to a low value, such as zero (0), which is lower than any possibly valid received sequence number, and a provisional bit set to true (1).

The resource request handling program 220 (FIG. 2A) then sets the first sequence number (Seq. No. 1) of the entry for resource R to the second sequence number (Seq. No. 2) (i.e., the sequence number in the client request) at 338. In the event that the second sequence number is an invalid sequence number, the first sequence number is set to the default value. Alternately, the first sequence number is left unchanged because it was previously initialized to the default value. Assuming the second sequence number was valid, the new entry for resource R, which is stored in the resource table, stores the second sequence number received from the client instead of the default first sequence number. After creating and setting the values in the new entry for resource R, the resource request handling program rejects the request to access the resource R, at 340. In some embodiments, the resource request handling program rejects the request to access the resource R with a "verify-and-retry" error. This manner of rejection instructs the client to retry accessing the resource.

The rejection is received by the client 104 (FIG. 1), at 342. The resource request procedures 258 (FIG. 2C) on the client 104 (FIG. 1) then check whether the lock is valid and/or held, at 344. This may involve communicating with the locking service server 102 (FIG. 1), which checks if the lock is valid and/or held, at 346. Alternatively, the resource request procedures may check locally whether the lock is valid and/or held, at 344.

If the lock is not held (348—No), then the process repeats itself, by the client requesting a lock from the locking service server, at 302 (FIG. 3A). However, if the lock is held (348—Yes), then the client again requests access to the Resource R at 312 (FIG. 3A). The request is then received by the server, at 316, as described above. The resource request handling program 220 (FIG. 2A) on the server then determines whether there is an entry 226 (FIG. 2B) for the resource R, for which access is being requested, at 318. This time, as a new entry for the resource was previously created (as described above), there is now an entry for resource R (318—Yes). The resource request handling program then determines whether the second sequence number (Seq. No. 2) is smaller than the first sequence number (Seq. No. 1), i.e., whether Seq. No. 2<Seq. No. 1, at 320. If the second sequence number (Seq. No. 2) is smaller than the first sequence number (Seq. No. 1) (320—Yes), then the server rejects the request to access the resource R, at 322. The client receives the rejection and requests a new lock, at 302. In other words, where the sequence number accompanying the request to access the resource is lower than the current sequence number associated with a particular resource R, then the request to access the resource is rejected, as a request having a higher sequence number was previously received for the particular resource R.

If the second sequence number (Seq. No. 2) is not smaller than the first sequence number (Seq. No. 1) (320—No), then the request handling program 220 (FIG. 2A) on the server determines whether the second sequence number (Seq. No. 2) is equal to the first sequence number (Seq. No. 1), i.e., whether Seq. No. 2=Seq. No. 1, at step 324. If the second sequence number (Seq. No. 2) is equal to the first sequence number (Seq. No. 1) (324—Yes), then the client is allowed to access the resource R, at 326 and 328. The provisional bit in the entry for the resource R is set to zero (0, False) at step 326. In other words, where the client has requested access to a resource R for the first time since the server was initialized, and the server has instructed the client to check whether the lock is valid and/or held, the client is given access to the resource on a subsequent request for access, if the lock is valid and/or held.

If the second sequence number (Seq. No. 2) is not equal to the first sequence number (Seq. No. 1) (324—No), then the request handling program 220 (FIG. 2A) on the server determines whether the provisional bit is set to false or zero (0), at 330. In other words, if the second sequence number (Seq. No. 2) is larger the first sequence number (Seq. No. 1), then the request handling program determines whether the provisional bit is set to false or zero (0). The provisional bit is only set to false or zero (0) when the resource R has been accessed for the first time after server initialization at step 326.

If the provisional bit is not false or zero (330—No), i.e., the resource has not yet been accessed for the first time since server initialization, then the first sequence number is set to the second sequence number, at step 338 (FIG. 3B), and the request is rejected with a "verify-and-retry" error at step 340, as described above. If, however, the provisional bit is false or zero (330—Yes), i.e., the resource has been accessed for the first time since server initialization, then the client is allowed to access the resource R, at 332 and 334. The first sequence number (Seq. No. 1) is set to the second sequence number (Seq. No. 2), at 332, and stored in the entry 226 (FIG. 2B) for that resource R.

Accordingly, the above described embodiment provides a system and method for enforcing a locking regime at a server without requiring a local persistent state or direct constant communication between the server and a global locking service.

It should be noted that the server 106 may at any time discard entries from the resource table 218, for instance, to reclaim memory. A set of oldest, or least recently used entries may be discarded. Discarding entries from the resource table 218 causes no adverse consequences other than requiring the generation of new entries when locks on the associated resources are requested.

The system and method described above may be used more generally for enforcing a global ordering of messages. In such embodiments, the locking service server 102 becomes a distributor of global ordering sequence numbers or timestamps, and resource access requests become messages. Messages from clients include sequence numbers obtained from a service. Messages from clients are accepted and rejected by the server in accordance with the sequence numbers of the messages, using the system and method as described above. Multiple message sequences are supported by assigning each distinct message sequence a respective distinct message thread identifier, which replaces the resource identifier in the above described embodiments.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

We claim:

1. A method for locking a resource, the method performed by a server having one or more processors and memory storing one or more programs for execution by the one or more processors so as to perform the method, the method comprising:

initializing the server including initializing a resource table configured to store entries corresponding to requests to access respective resources in the server;

receiving at the server a request from a client to access a particular resource on the server, wherein the client and server are distinct systems interconnected by a communications network;

determining that since initializing the server, the server has not received a request to access the particular resource;

in response to the request and a positive result from the determining, returning a provisional rejection to the client, requiring the client to verify that it holds a lock on the particular resource;

after the determining, storing an entry in a data structure for the particular resource, where the entry includes a first sequence number set to a second sequence number received with the request, and a provisional bit set to true; where the second sequence number was provided to the client by a service;

receiving at the server an additional request from the client to access the particular resource on the server, the additional request including a third sequence number;

determining whether the third sequence number is equal to the first sequence number; and when the third sequence number is determined to equal the first sequence number, allowing the client to access the particular resource, and setting the provisional bit to false.

2. A method for locking a resource, the method performed by a server having one or more processors and memory storing one or more programs for execution by the one or more processors so as to perform the method, the method comprising:

initializing the server including initializing a resource table configured to store entries corresponding to requests to access respective resources in the server;

receiving at the server a request from a client to access a particular resource on the server, wherein the client and server are distinct systems interconnected by a communications network;

determining that since initializing the server, the server has not received a request to access the particular resource;

in response to the request and a positive result from the determining, returning a provisional rejection to the client, requiring the client to verify that it holds a lock on the particular resource; and when the determining produces a positive result, storing an entry in a data structure for the particular resource, where the entry includes a first sequence number set to a second sequence number received with the request, where the second sequence number was given to the client by a service, and a provisional bit set to true;

the method further including:

receiving at the server an additional request from the client to access the particular resource on the server, the additional request including a third sequence number, and comparing the third sequence number with the first sequence number;

determining whether the third sequence number is equal to the first sequence number; and when the third sequence number is determined to equal the first sequence number, allowing the client to access the particular resource, and setting the provisional bit to false.

3. A method for locking a resource, the method performed by a server having one or more processors and memory storing one or more programs for execution by the one or more processors so as to perform the method, the method comprising:

initializing the server including initializing a resource table configured to store entries corresponding to requests to access respective resources in the server;

receiving at the server a request from a client to access a particular resource on the server, wherein the client and server are distinct systems interconnected by a communications network;

determining that since initializing the server, the server has not received a request to access the particular resource;

in response to the request and a positive result from the determining, returning a provisional rejection to the client, requiring the client to verify that it holds a lock on the particular resource; and when the determining produces a positive result, storing an entry in a data structure for the particular resource, where the entry includes a first sequence number set to a second sequence number received with the request, where the second sequence number was given to the client by a service, and a provisional bit set to true;

the method further including:

receiving at the server an additional request from the client to access the particular resource on the server, the additional request including a third sequence number, and comparing the third sequence number with the first sequence number;

determining whether the third sequence number is higher than the first sequence number;

determining whether the provisional bit is false;

when the provisional bit is determined to be false and the third sequence number is determined to be higher than the first sequence number, allowing the client to access the particular resource, setting the first sequence number to the third sequence number.

4. The method of claim 3, including when the provisional bit is determined to be true, setting the first sequence number to the third sequence number, and returning a provisional rejection to the client, requiring the client to verify that it holds a lock on the particular resource.

5. A method for locking a resource, the method performed by a server that is interconnected by a communications network to and is distinct from a client and a service, the server including one or more processors and memory storing one or more programs to be executed by the one or more processors so as to perform the method, the method comprising:

storing a first sequence number in an entry for a resource on the server;

receiving at the server a request from the client to access the resource on the server, where the request includes a second sequence number obtained from the service;

allowing the client to access the resource, if the second sequence number is equal to the first sequence number;

setting a provisional bit for the resource to false in the entry for the resource on the server, if the second sequence number equals the first sequence number; and rejecting the request to access the resource, if the second sequence number is lower than the first sequence number.

6. The method of claim 5, further comprising, when the provisional bit for the resource is true, allowing the client to access the resource only if the second sequence number is equal to the first sequence number.

7. The method of claim 6, further comprising, if the second sequence number is higher than the first sequence number, setting the first sequence number to the second sequence number in the entry for the resource on the server.

8. The method of claim 5, wherein if the provisional bit is true and the second sequence number is higher than the first sequence number, further comprising:

setting the first sequence number to the second sequence number in the entry for the resource on the server; and returning a provisional rejection to the client, requiring the client to verify that it holds a lock on the resource.

9. The method of claim 5, further comprising, before the storing, initializing the server, and determining that since the initializing, the server has not received a request to access the resource; and after the receiving, returning a provisional rejection to the client to verify that it holds a lock on the resource.

10. The method of claim 9, wherein said initializing further comprises:

creating a default entry for a resource on a server, where said default entry includes:

a first sequence number set to a value lower than a lowest valid sequence number received by the server; and
a provisional bit set to true.

11. A method for enforcing a global ordering of messages, the method performed by a server that is interconnected by a communications network to and is distinct from a client and a service, the server including one or more processors and memory storing one or more programs to be executed by the one or more processors so as to perform the method, the method comprising:
storing a first sequence number in an entry for a message thread;
receiving at the server a message for the message thread from the client, where the message includes a second sequence number obtained from the service;
accepting the message for the message thread if the second sequence number is equal to the first sequence number;
rejecting the message for the message thread if the second sequence number is lower than the first sequence number; and
upon receiving the message, determining whether the server has a record of having previously received a message for the message thread, and when the determination is negative, returning a provisional rejection to the client, requiring the client to verify the second sequence number and to resubmit the message.

12. The method of claim 11, further comprising,
when the determination is negative, setting a provisional bit for the message thread to true in the entry for the message thread; and
upon receiving the message, determining whether the provisional bit for the message thread is true, and when the determination is positive, accepting the message only if the second sequence number is equal to the first sequence number.

13. A server system, comprising:
a processor;
at least one resource;
a data structure comprising an entry for a particular resource of said at least one resource, said entry including a first sequence number;
communication procedures, executable by the processor, for receiving a request from a client to access the particular resource, where the request includes a second sequence number obtained from a service that is interconnected to the server system and the client by a communications network and is distinct from the server system and the client;
a resource request handling program, executable by the processor, comprising:
instructions for allowing the client to access the resource, if the second sequence number is equal to the first sequence number;
instructions for setting a provisional bit for the resource to false in the entry for the resource on the server system, if the second sequence number equals the first sequence number; and
instructions for rejecting the request to access the resource, if the second sequence number is lower than the first sequence number.

14. The system of claim 13, the resource request handling program further comprising:
instructions for accessing the provisional bit for the resource, and when the provisional bit for the resource is true, for allowing the client to access the resource only if the second sequence number is equal to the first sequence number.

15. The system of claim 13, further comprising:
instructions for initially setting the provisional bit for the resource to true;
the resource request handling program further comprising:
instructions for processing the request, including instructions for accessing the provisional bit for the resource, and when the provisional bit for the resource is true and the second sequence number is not equal to the first sequence number, returning a provisional rejection to the client, requiring the client to verify the second sequence number and to resubmit the request.

16. A server system, comprising:
a processor;
a data structure comprising an entry for a particular message thread, said entry including a first sequence number;
communication procedures, executable by the processor, for receiving a message from a client, where the message includes a second sequence number obtained from a service that is interconnected to the server system and the client by a communications network and is distinct from the server system and the client;
a message handling program, executable by the processor, comprising:
instructions for accepting the message for the message thread, if the second sequence number is equal to the first sequence number;
instructions for rejecting the message for the message thread, if the second sequence number is lower than the first sequence number; and
instructions for determining, upon receiving the message, whether the server system has a record of having previously received a message for the message thread, and when the determination is negative, returning a provisional rejection to the client, requiring the client to verify the second sequence number and to resubmit the message.

17. The system of claim 16, the message handling program further comprising:
instructions for setting a provisional bit for the resource to false in the entry for the message thread, if the second sequence number equals the first sequence number.

18. The system of claim 17, the message handling program further comprising:
instructions for accessing the provisional bit for the message thread, and when the provisional bit for the message thread is true, for accepting the message only if the second sequence number is equal to the first sequence number.

19. The system of claim 17, further comprising:
instructions for initially setting the provisional bit for the message thread to true;
the message handling program further comprising:
instructions for processing the message, including instructions for accessing the provisional bit for the message thread, and when the provisional bit for the message thread is true and the second sequence number is not equal to the first sequence number, returning the provisional rejection to the client, requiring the client to verify the second sequence number and to resubmit the message.

20. A non-transitory computer readable storage medium storing one or more programs configured to be executed by a computer system, the one or more programs comprising instructions for:
storing a first sequence number in an entry for a resource on a server;

receiving at the server a request from a client to access the resource on the server, where the request includes a second sequence number obtained from a service distinct from the server and the client;

allowing the client to access the resource, if the second sequence number is equal to the first sequence number;

setting a provisional bit for the resource to false in the entry for the resource on the server, if the second sequence number equals the first sequence number; and rejecting the request to access the resource, if the second sequence number is lower than the first sequence number.

21. A non-transitory computer readable storage medium storing one or more programs configured to be executed by a computer system, the one or more programs comprising instructions for:

storing a first sequence number in an entry for a message thread;

receiving at a server a message for the message thread from a client, where the message includes a second sequence number obtained from a service distinct from the server and the client;

accepting the message for the message thread if the second sequence number is equal to the first sequence number;

rejecting the message for the message thread if the second sequence number is lower than the first sequence number; and determining, upon receiving the message, whether the server has a record of having previously received a message for the message thread, and when the determination is negative, returning a provisional rejection to the client, requiring the client to verify the second sequence number and to resubmit the message.

* * * * *